United States Patent [19]

Burge et al.

[11] 4,037,000

[45] July 19, 1977

[54] ICING MIXTURE

[75] Inventors: Malcolm Leonard Ernest Burge, Thatcham; Heather Ann Gill, Reading, both of England

[73] Assignee: Tate & Lyle Limited, London, England

[21] Appl. No.: 734,960

[22] Filed: Oct. 22, 1976

[30] Foreign Application Priority Data

Oct. 24, 1975 United Kingdom ............... 43749/75

[51] Int. Cl.² .............................................. A23G 3/00
[52] U.S. Cl. .................................. 426/572 ; 426/659
[58] Field of Search ....................... 426/659, 572, 573

[56] References Cited

U.S. PATENT DOCUMENTS

| | | | |
|---|---|---|---|
| 2,963,373 | 12/1960 | Monti et al. | 426/659 |
| 3,253,928 | 5/1966 | Bedenk et al. | 426/659 |
| 3,464,830 | 9/1969 | Wahba | 426/659 |
| 3,676,155 | 7/1972 | Horn | 426/659 |
| 3,767,830 | 10/1973 | Reimer | 426/659 |

*Primary Examiner*—Jeanette M. Hunter
*Attorney, Agent, or Firm*—Ostrolenk, Faber, Gerb & Soffen

[57] ABSTRACT

An icing composition which can be stored and which is ready for use comprises a mixture obtained by admixture of a first component comprising powdered sucrose optionally together with one or more other sugars of lower molecular weight in powder or syrup form, and a second component comprising an aqueous gel of xanthan gum containing up to 10% dry weight of xanthan gum, said mixture containing at least 82% by weight of sugar or sugars; the icing composition containing from 6.0 to 10.5% by weight of water and from 0.15 to 0.7% by weight of dry xanthan gum.

21 Claims, No Drawings

ICING MIXTURE

This invention relates to icing, especially to icing of the so-called 'royal' type, in a form ready for use.

Royal icing is traditionally prepared by cold mixing of powdered sucrose (icing sugar) with egg whites and optionally with a little water, vinegar or lemon juice to the desired consistency. It dries in a day or two to give the well-known firm, non-sticky icing used on baked goods and confections such as Christmas cakes. Each batch has to be made up immediately before use as the mixture is inherently unstable in storage and sets hard after a short while or alters its texture to become unpleasantly gritty because of progressive cyrstal growth.

Dry mix 'instant' icing mixtures for reconstitution by addition of water before use have been proposed, but no stable royal type icing mixture which could be stored for long periods and then used directly, has previously been devised.

We have now found that certain combinations of sugar and water with xanthan gum produce a soft, pliable icing mixture which will keep in sealed packs for extended periods without deterioration, but which, on use, will set to a firm royal-type icing or alternatively to a softer fudge-like icing.

According to the present invention, we provide an icing composition comprising a mixture obtained by admixture of a first component comprising powdered surcrose, optionally together with one or more other sugars of lower molecular weight in power or syrup form, and a second component comprising an aqueous gel of xanthan gum containing up to 10% dry weight of xanthan gum, said mixture containing at least 82% by weight of sugar or sugars; the icing compositon containing from 6.0 to 10.5% by weight of free water and from 0.15 to 0.7% by weight of dry xanthan gum.

Xanthan gum is a high molecular weight polysaccharide produced in a pure culture process of the microorganism *Xanthomonas campestris*. A particularly suitable form is that supplied as "Food Grade" by Kelco Ltd.

The aqueous gel of xanthan gum conveniently contains from 3% to 10% by weight of the gum, advantageously about 6%. Too dilute a gel increases the water content of the mixture higher than that required and concentrations higher than 10% are too viscous to handle easily and to ensure uniform hydration of the gum.

A xanthan content of up to 0.5% by weight in the composition is preferred, since this gives a firm royal-type icing on setting. If the xanthan content is increased above this level e.g. to about 0.6%, the set product has a pleasant fudge-like texture having a thin crust and a soft interior, which is very suitable as a topping, for example for cup cakes, but quite different from conventional royal icing.

The sugar/gum mixture may be used alone in the composition or the gum may be augmented by the addition of egg white solids, for example up to 3%, desirably about 1%, by weight of the composition. Egg white solids are preferably added in conjunction with a polyphosphate salt such as sodium tripolyphosphate to enhance the waterbinding capacity of the protein.

The amount of polyphosphate added preferably should not exceed 1.1% by weight to avoid affecting the flavour of the icing.

The composition may also advantageously contain a humectant polyhydric alcohol such as propylene glycol, polyethylene glycol or, preferably, glycerol. The alcohol may be present in an amount of up to 3% by weight of the composition, preferably from 1.2 to 1.7%. This amount should not be exceeded if the icing is required to set to a dry firm state. Softer, pipable icings may contain higher amounts, e.g. from 15 to 18% by weight, conveniently about 16.5%.

As stated, the free water content of the composition must not exceed 10.5% by weight. A preferred water content is from 6.5 to 9.5% by weight. The term "free water" is used to exclude bound water, for example in dextrose monohydrate.

The sucrose may be used alone, as powdered sugar (icing sugar), but alternatively a proportion of the total sugar content may consist of lower molecular weight sugars, in particular monosaccharides such as dextrose, either in a finely divided pure solid form such as dextrose monohydrate, or as glucose syrup, invert syrups or mixtures thereof. Use of lower molecular weight sugars increases the osmotic pressure in the mixture and improves stability against microbial attack. The plasticity of the composition is enhanced but the setting time is prolonged and a softer set is obtained. Dextrose monohydrate may replace sucrose and constitute up to 24% by weight of the mixture. Glucose syrups, invert solids, etc. contain water and thus can only constitute a smaller fraction of the mixture, in general up to 10% by weight.

The mixture may also contain colouring and flavouring agents as desired.

The icing composition of the present invention is a smooth pliable paste which can be sealed in a water-impervious material such as plastics film or metal foil and stored for considerable periods without deterioration. The product is resistant to degradation by bacteria and fungi, even mesophilic bacteria and osmotolerant yeasts and moulds. The resistance is increased when monosaccharides such as glucose are present. Our tests have shown that after inoculations of the mixture with cultures of such microorganisms and subsequent storage at room temperature or 30° C for six months, the microorganisms had not proliferated and in fact the viability had in most cases diminished. This resistance results from the phase stability of the product giving a uniformly high sugar content and is particularly desirable in a product which cannot be heat-sterilised and in which the presence of sulphur dioxide is undesirable.

The product also remains smooth-textured on storage and is not subject to increasing grittiness caused by crystal growth. It is believed that this is in part due to the water-binding capacity of the xanthan gum.

The composition is ready for immediate use.

In general, for icing a large cake, the composition is rolled to the desired thickness, advantageously using a little corn flower to prevent sticking, and applied directly to the cake or to a first layer of marzipan. Other decorations such as flowers or leaves can be moulded separately and applied to the cake, and the conventional piped designs can be applied using a pipable composition. After two or three days in a dry, well ventilated place, the icing has set to a firm, non-sticky finish.

The compositions according to the present invention may be prepared by cold admixture of the various ingredients. Conveniently, however, the xanthan gum is dissolved in the necessary water, other liquid ingredients such as glucose syrup, colouring and flavouring agents and glycerol are added, and the mixture blended, preferably with gentle warming, for example to about 35° C maximum. This mixture is then blended with the sucrose and any other dry ingredients until a homogeneous paste is obtained.

EXAMPLE 1

Royal-type icing

| | | |
|---|---|---|
| icing sugar | 72.93 | parts by weight |
| dextrose monohydrate | 11.92 | parts by weight |
| glucose syrup (62 DE) | 6.89 | parts by weight |
| glycerol | 1.38 | parts by weight |
| 6% aqueous xanthan solution | 6.88 | parts by weight |
| | 100.00 | |

(free water content approx. 7.7% by weight)

A 6% aqueous gel of xanthan gum was prepared approximately 2 hours before use to ensure full hydration. The other liquid ingredients — glycerol and glucose syrup were then blended into the xanthan solution at 35° C.

The dry ingredients — sugar and dextrose monohydrate — were pre-blended. The liquid ingredients were then blended into the dry sugar mixture using a domestic food mixer fitted with a dough hook attachment. The homogeneous "dough" was divided and packed.

EXAMPLE 2

Royal-type icing

| | | |
|---|---|---|
| icing sugar | 82.58 | parts by weight |
| glucose syrup (62 DE) | 7.08 | parts by weight |
| propylene glycol | 1.42 | parts by weight |
| egg white solids | 0.96 | parts by weight |
| sodium polyphosphate | 0.88 | parts by weight |
| 6% xanthan gum solution | 7.08 | parts by weight |
| | 100.00 | |

(free water content approx. 7.9% by weight)

The liquid ingredients — xanthan solution, glucose syrup and propylene glycol — were mixed at 35° C as in Example 1. The egg white solids and polyphosphate were then added and blended in and this liquid mix was then added to the sugar in a mixer.

This procedure gives a better overall appearance than the Example 1 and a smoother mouthfeel.

EXAMPLE 3

Fudge-type icing

| | | |
|---|---|---|
| icing sugar | 70.51 | parts by weight |
| dextrose monohydrate | 11.52 | parts by weight |
| glucose syrup (62 DE) | 6.66 | parts by weight |
| glycerol | 1.81 | parts by weight |
| 6% aqueous xanthan solution | 9.50 | parts by weight |
| | 100.00 | |

(free water content approx. 8.9% by weight)

The icing composition was blended as in Example 1 to give a mix which sets to a fudge-like texture.

EXAMPLE 4

Pipable icing

| | | | |
|---|---|---|---|
| icing sugar | 69.96 | parts by weight | (85.38%) |
| glucose syrup (62 DE) | 5.99 | parts by weight | ( 7.31%) |
| 6% aqueous xanthan solution | 5.99 | parts by weight | ( 7.31%) |
| | | | 100.00 |
| egg white solids | 0.82 | parts by weight | |
| sodium polyphosphate | 0.73 | parts by weight | |
| glycerol | 16.51 | parts by weight | |
| | 100.00 | | |

(free water content approx. 6.7% by weight)

The liquid ingredients — xanthan solution, glucose syrup and glycerol were mixed together at 35° C as in Example 1. The egg white solids and polyphosphate were then added and blended in and this liquid mix was added to the sugar in a mixer. The mixture may then be packed in a sealed piping bag.

The resulting composition is very soft and can be piped into the usual icing decorations. It sets to a soft finish with a firm crust.

We claim:

1. An icing composition comprising a mixture of (1) sugar comprising powdered sucrose and (2) an aqueous gel of xanthan gum containing up to 10% dry weight of xanthan gum, said mixture containing at least 82% by weight of sugar, said composition containing from 6.0 to 10.5% by weight of free water and from 0.15 to 0.7% by weight of dry xanthan gum.

2. A composition according to claim 1 in which the aqueous gel of xanthan gum contains from 3 to 10% by weight of xanthan gum.

3. A composition according to claim 2 in which the aqueous gel contains about 6% by weight of xanthan gum.

4. A composition according to claim 1 having a dry xanthan gum content of from 0.15 to 0.5% by weight.

5. A composition according to claim 1 containing egg white solids.

6. A composition according to claim 5 containing up to 3% by weight of egg white solids.

7. A composition according to claim 6 containing about 1% by weight of egg white solids.

8. A composition according to claim 5 further comprising a polyphosphate salt.

9. A composition according to claim 1 further comprising a humectant polyhydric alcohol.

10. A composition according to claim 9 in which the polyhydric alcohol is selected from the group comprising glycerol and propylene glycol.

11. A composition according to claim 9 containing up to 3% by weight of the polyhydric alcohol.

12. A composition according to claim 1 in which the total free water content is from 6.5 to 9.5% by weight.

13. A composition according to claim 1 further comprising at least one sugar of lower molecular weight than sucrose in powder or syrup form.

14. A composition according to claim 13 containing dextrose monohydrate, a sugar selected from the group comprising a glucose syrup and an invert syrup.

15. A composition according to claim 14 containing up to 24% by weight of dextrose monohydrate.

16. A composition according to claim 14 containing up to 10% by weight of a syrup or syrups selected from glucose syrup and invert syrup.

17. A process for the production of an icing composition according to claim 1, in which the said sucrose is admixed with the said gel and the mixture is blended until smooth.

18. A process according to claim 17 in which xanthan gum is dissolved in the necessary water, and then is blended with the sucrose until a homogeneous paste is obtained.

19. A process according to claim 18 in which the liquid ingredients are blended with gentle warming to 35° C maximum.

20. A composition according to claim 8 in which said salt is sodium tripolyphosphate and in present in an amount up to 1.1% by weight.

21. A composition according to claim 9 containing from 15 to 18% by weight of the polyhydric alcohol.

* * * * *